United States Patent [19]
Poignant et al.

[11] Patent Number: 6,112,553
[45] Date of Patent: Sep. 5, 2000

[54] METHOD OF MAKING A DEVICE FOR TEMPERATURE STABILIZING A BRAGG GRATING

[75] Inventors: Hubert Poignant, Ploulec'h; Valérie Fleury, Saint Brieuc; Joël Le Mellot, Pleumeur-Bodou, all of France

[73] Assignee: France Telecom, France

[21] Appl. No.: 09/211,100

[22] Filed: Dec. 15, 1998

[30] Foreign Application Priority Data

Dec. 16, 1997 [FR] France .................................. 97 15938

[51] Int. Cl.[7] .................................................. C03C 27/02
[52] U.S. Cl. .................... 65/41; 65/49; 65/59.1; 65/59.4; 65/59.6; 385/15; 385/31; 385/34; 385/37
[58] Field of Search ................... 65/41, 49, 59.1, 65/59.4, 59.6; 385/15, 31, 34, 37

[56] References Cited

U.S. PATENT DOCUMENTS

| | | | |
|---|---|---|---|
| 4,444,460 | 4/1984 | Stowe | 350/96.19 |
| 5,042,898 | 8/1991 | Morey et al. | 385/37 |
| 5,509,952 | 4/1996 | Moore et al. | 65/406 |
| 5,658,364 | 8/1997 | DeVore et al. | 65/431 |
| 5,694,503 | 12/1997 | Fleming et al. | 385/37 |
| 5,827,343 | 10/1998 | Engelke et al. | 65/102 |
| 5,841,920 | 11/1998 | Lemaire et al. | 385/37 |
| 5,914,972 | 6/1999 | Siala et al. | 372/33 |
| 5,991,483 | 11/1999 | Engelberth | 385/37 |

FOREIGN PATENT DOCUMENTS

| | | |
|---|---|---|
| 798573 | 10/1997 | European Pat. Off. . |
| WO9726572 | 7/1997 | WIPO . |

OTHER PUBLICATIONS

Yoffe G.W. et al: "Passive Temperature–Compensating Package For Optical Fiber Gratings" Applied Optics, vol. 34, No. 30 Oct. 20, 1995, pp. 6859–6891.

J.Stone and L.W. Stulz: "Passively Temperature–Compendsated Nontunable Fibre Fabry–Perot Etalons" Electronics Letters Sep. 2, 1993, pp. 1608–1609.

K.O. Hill et al.: "Photosensitivity in optical fiber waveguides: Application to reflection filter fabrication" Appl. Phys. Letter, vol. 32, No. 10, May 15, 1978, pp. 647–649.

J. Rioublanc et al.: "Optimisation D'un systeme de stabilisation passive de la derive en temperature de al longueur d'onde d'accord des reseaux de bragg" JNOG 96, papier No. 85 pp. 261–263.

T. Iwashima et al. "Temperature compensation for fibre Bragg gratings using liquid crystalline polymer tubes" Electronics Letters, vol. 33, No. 5, Feb. 27, 1997 pp. 417–419.

*Primary Examiner*—Sean E Vincent
*Attorney, Agent, or Firm*—Blakely Sokolff Taylor & Zafman

[57] ABSTRACT

The invention relates to a method of making a device for stabilizing a Bragg grating relative to temperature, the device being of the type comprising two materials having coefficients of thermal expansion that are far apart, the method comprising the steps consisting in:

supplying a glass and a metal suitable for fixing to each other by a chemical reaction between them in an appropriate range of temperatures; and putting the glass and the metal into contact with each other at a temperature lying in said appropriate temperature range so as to fix them together.

24 Claims, 6 Drawing Sheets

METHOD OF MAKING A DEVICE FOR TEMPERATURE STABILIZING A BRAGG GRATING

FIELD OF THE INVENTION

The present invention relates to devices for reducing the natural temperature drift of the resonant wavelength or "Bragg" wavelength in Bragg gratings photoetched in optical fibers, and more precisely it relates to such devices operating on the principle of differential expansion between two materials.

The invention is applicable in any device incorporating a Bragg grating, when it is desirable for the characteristics of the grating to be stable relative to temperature.

BACKGROUND OF THE INVENTION

Bragg gratings were first photoetched in optical fiber cores or in planar waveguides in 1978 by K. O. Hill who applied ultraviolet irradiation (190 nm to 250 nm) transversely to optical fibers. That technique is described in document [1].

These components are presently under intense development due in particular to the multiplicity of applications in which they are used.

They are thus to be found in the field of optical telecommunications, e.g. for wavelength division multiplexing, for compensating chromatic dispersion in optical fibers, for stabilizing and flattening the gain of optical amplifiers, for stabilizing the frequency of semiconductor lasers, and more generally in optical fiber lasers and in various filters.

They are also to be found in the field of sensors, e.g. strain or temperature sensors.

A major drawback of Bragg gratings is that they present characteristics that are sensitive to temperature variations.

Thus, the Bragg wavelength $\lambda_B$ of a uniform grating is given by the following relationship: $\lambda_B = 2n_{eff} \times \Lambda$ where $n_{eff}$ and $\Lambda$ designate respectively an effective refractive index of the guided mode and a pitch of the grating.

Under the effect of a temperature fluctuation $\delta T$, the wavelength $\lambda_B$ of a free grating is subject to a variation $\delta\lambda_B$ given by the relationship:

$$\delta\lambda_B/\delta T = (\alpha + \zeta) \cdot \lambda_B$$

where $\alpha$ and $\zeta$ represent the coefficient of thermal expansion and the thermo-optical coefficient of the core glass, and generally have respective values of $0.5 \times 10^{-6}$ $K^{-1}$ and $7 \times 10^{-6}$ $K^{-1}$.

Thus, for a free etched grating having a wavelength at 20° C. and in a non-prestressed state of about 1550 nm, the Bragg wavelength $\lambda_B$ changes by about 1.2 nm for a temperature change of 100° C.

In numerous applications, variations in the characteristics of gratings due to temperature fluctuations are to be avoided, so it is necessary to provide devices that enable that drawback to be remedied.

For example, in the field of optical telecommunications, it is generally necessary to obtain gratings having characteristics that are highly stable, and that remain so over a temperature range that can extend from 20° C. to +80° C.

Various devices have been proposed seeking to stabilize the Bragg wavelength or resonant wavelength of a Bragg grating relative to temperature.

Active systems have been proposed, for example devices including Peltier type elements, in which the Bragg wavelength is measured continuously and corrected by applying mechanical stresses.

Such systems are expensive and bulky.

In general, preference is given to so-called passive devices.

Two types of passive device are presently known that enable the temperature sensitivity of the Bragg wavelength of gratings to be reduced.

A first type of device has a support material with a negative coefficient of thermal expansion and the Bragg grating is stuck thereto with a selected amount of pretension.

When temperature rises, the support material with the negative coefficient of expansion contracts, thereby reducing the initial pretension applied to the grating while it was being fixed thereto. The support material therefore tends to stabilize the Bragg wavelength around its initial value.

Thus, proposals are made in document [2] to use an oriented copolymer as the material having a negative coefficient of expansion. In document [3], proposals have been made to use certain glass-ceramics as the support material, however fabrication thereof is still at the laboratory stage.

Devices of the first type suffer from two major drawbacks. Thus, the coefficient of thermal expansion must be accurately matched and must be constant from one sample of the material to another, which is difficult to achieve in practice. Secondly, it turns out to be difficult to machine such materials without spoiling the properties thereof, and in particular without altering their coefficients of thermal expansion.

A second type of device for temperature stabilizing a Bragg grating operates on the principle of differential expansion. In such devices, two elements are used whose component materials have coefficients of thermal expansion that are very different, so that when temperature rises, pretension initially given to the grating is relaxed.

Documents [4], [5], [6], and [7] thus propose associating aluminum as the material having the greater coefficient of expansion with Invar, silica, stainless steel, or iron as the material having the smaller coefficient of expansion.

Those devices are particularly lengthy and difficult to make. Fabrication requires a large number of technological steps. Furthermore, those devices can have a large number of points of adhesive, in particular between metal and glass, and the long-term behavior of such bonds turns out to be unreliable.

Making such devices also requires both the pretension applied to the grating and the spacing between two end fixing studs for a fiber having a Bragg grating to be accurately controlled. Such control is extremely difficult to perform with the desired degree of precision.

OBJECTS AND SUMMARY OF THE INVENTION

The main aim of the present invention is to propose a method of making differential expansion type devices for temperature stabilizing Bragg gratings, which method is particularly easy to implement, enabling the spacing between two fixing studs for the grating to be controlled precisely, and enabling devices to be made in which points of adhesive are restricted to points at the two ends of the grating.

Another object of the invention is to propose a method enabling devices to be made that are particularly effective in terms of grating stabilization, and particularly reliable in terms of maintaining such performance.

Another object of the invention is to propose a method enabling glass studs to be associated with a metal support without using conventional adhesive.

Another object of the invention is to propose a method enabling devices to be made that are one-piece, compact, robust, and occupy little space.

According to the present invention, these objects are achieved by a method of making a device for stabilizing the Bragg wavelength of a Bragg grating relative to variations in temperature, the device being of the type having two materials with different coefficients of thermal expansion that are far apart from each other, and adapted on an increase in temperature to produce relaxation of pretension initially applied to the grating, the method comprising the steps consisting in:

a) supplying a glass and a metal suitable for fixing to each other by a chemical reaction between them in an appropriate temperature range; and b) putting the glass into contact with the metal at a temperature lying in said appropriate temperature range.

The invention also provides an optical component comprising a Bragg grating and a device for stabilizing the Bragg wavelength of the grating relative to temperature variations, and made by such a method.

BRIEF DESCRIPTION OF THE DRAWINGS

Other characteristics, objects, and advantages of the invention appear on reading the following detailed description and on observing the accompanying drawings given by way of non-limiting example and in which.

MORE DETAILED DESCRIPTION

Figure 1:
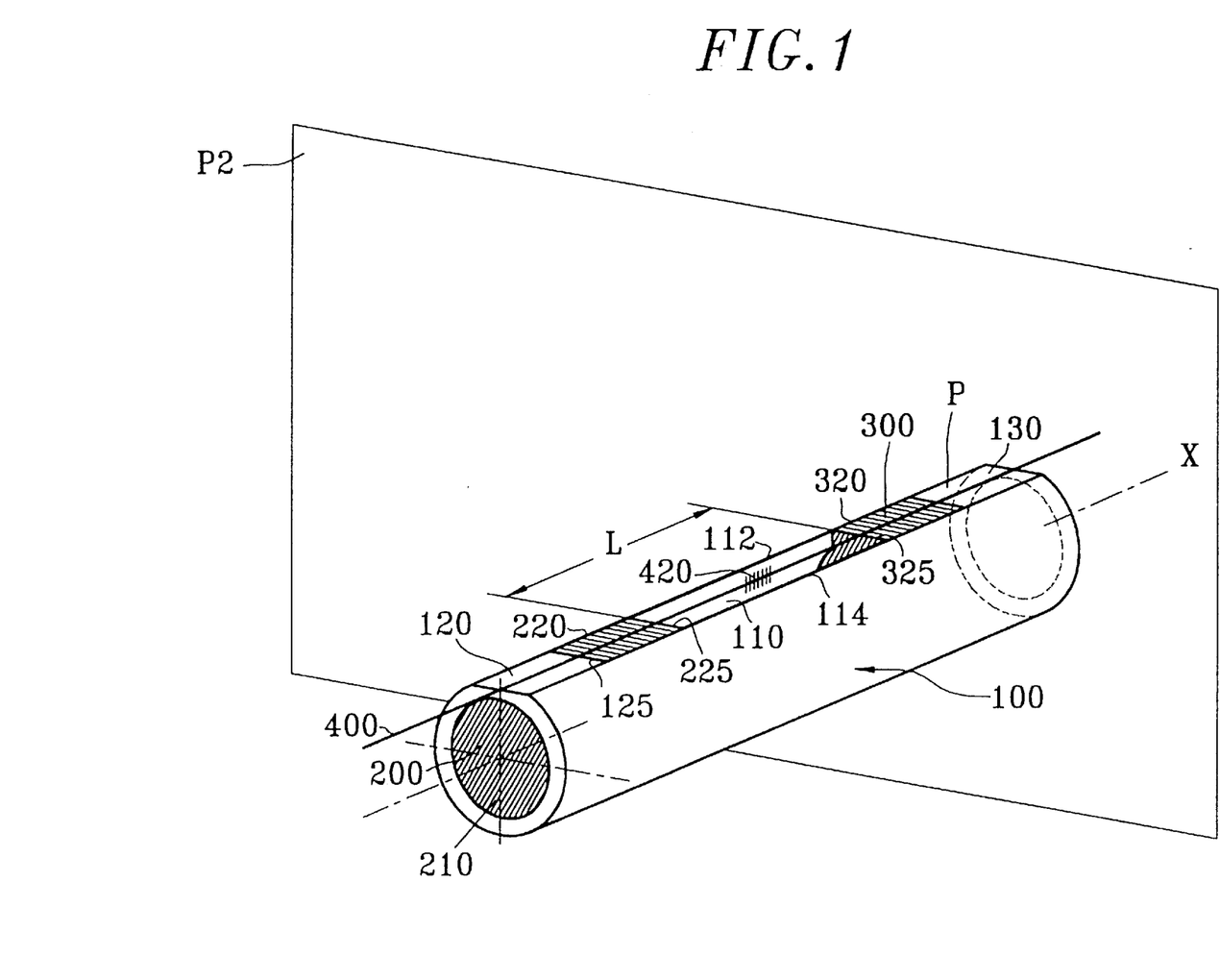
FIG. 1 is a perspective view of a device constituting a first variant of the invention.

FIG. 1 shows a first device of the present invention. This device is generally in the form of a right circular cylinder having a main axis of circular symmetry referenced X in FIG. 1.

The device comprises four main portions, namely: a substantially tubular metal support 100; two glass studs 200 and 300 located at the ends of the support 100; and an optical fiber 400 fixed to each of the studs 200 and 300. A Bragg grating 420 is photoetched in the optical fiber 400.

The support 100 is generally in the form of a tube. In the embodiment shown in FIG. 1, the tube has an outside radius substantially equal to one-fourth the length of the tube, and an inside radius substantially equal to ⅘ the outside radius of the tube.

Naturally, dimensions of any type can be adopted for the tubular shape of the support 100. For example, a support can be made having a length of about 50 mm, with inside and outside radius pairs having the values 6 mm & 8 mm, 8 mm & 10 mm, or even 6 mm & 10 mm.

The tubular support 100 has a top window 110 constituting an opening between the inside and the outside of the tube. In this case, the opening 110 is rectangular in shape and extends longitudinally relative to the tube over about two-thirds of the length of the tube 100. The window 110 is of constant width which is substantially equal to the outside radius of the tube 100.

The window 110 has two rectilinear longitudinal edges 112 and 114 that are parallel to the axis X. These two edges define a plane P which is parallel to the direction of the axis X. The opening 110 is extended longitudinally between each of its ends by respective plane surfaces 120 and 130, each of which is coplanar with the plane P. Each of these two plane surfaces extends from the opening 110 to an end of the tube 100.

The support 100 thus has the general shape of a tube that has been cut longitudinally along its entire length on a plane section surface P parallel to the axis X, said surface P being at a distance from the axis X which is greater than the inside radius of the tube, said tube also having a longitudinal opening passing through the section surface P, which opening has the same width as the section surface P.

The device shown in FIG. 1 also has two glass studs 200 and 300 placed in the tube 100 at the ends thereof. The device is symmetrical about a plane P2 intersecting it halfway along and perpendicular to the direction X. Thus, the description below relates only to a first half of the device including the stud 200, with the second half being symmetrical to the first.

The stud 200 extends from a first end of the tube 100 over a first third of the length of the tube. The stud 200 thus has a plane end surface 210 perpendicular to the direction X and coinciding with a plane containing a substantially circular edge defined by a first end of the tube 100.

The first third of the support 100 occupied by the stud 200 comprises two portions, referred to below respectively as the first cylindrical passage and as the open-topped tubular portion.

The first cylindrical passage extends along the direction X from the first end of the tube 100 to the end of the window 110 adjacent to said first end of the tube.

This passage is constituted by a cylindrical wall of closed transverse outline. The inside of the first passage is accurately cylindrical, while the outside outline of the first passage has a top section on the plane P, as described above.

This passage is extended towards the center of the support 100 by the open-topped tubular portion. This tubular portion differs from the first cylindrical passage only in that the top section is replaced by a portion of the window 110.

Thus, this tubular portion presents a circular section transverse to the direction X from which a top circularly arcuate portion is missing.

This cross-section has an inside outline and an outside outline.

The outside outline is merely a circular line of diameter equal to the outside diameter of the tube, with a top gap.

The inside outline is formed mainly by a circular line concentric with the outside outline and with a top gap, but it also has two vertical segments each interconnecting a respective end of the inside circular line with the corresponding end of the circular line constituting the outside outline.

The stud 200 is placed in complementary manner in the first end third of the tube. Thus, it presents two substantially cylindrical portions about the axis X which together form a single piece. A first portion is an accurate circular cylinder and fills the first cylindrical passage in complementary manner. The second portion fills the open-topped tubular portion in complementary manner. More precisely, the second portion extends along the axis X from the first portion to one-third of the way along the tube where it forms an end plane inside the device and extending substantially transversely to the axis X. The second portion of the stud not only fills the circularly cylindrical space defined by the support 100, but also fills the opening 110 passing through the wall of the tube 100 so as to form a top face that is coplanar with above-described plane P. The stud 200 thus fills that portion of the window 110 which belongs to the first third of the tube 100, and does so through the entire thickness of the window 110.

This second portion of the stud thus forms a cylinder of radius equal to the inside radius of the tube 100, and it carries on its top a projection 220 of rectangular shape, said projection 220 being complementary to the portion of the window 110 that is situated in the first end third of the tube 100.

The window 110 has an end edge 125 adjacent to the first end of the tube 100 and constituted by a surface that is substantially perpendicular to the direction X, and facing a central portion of the device. The stud 200 is in contact with this surface via its top projection 220.

At the intersection between the inside end face of the device perpendicular to the direction X and the top plane surface of the projection 220, the stud 200 forms an edge 225 extending perpendicularly to the direction X.

Between their end surfaces inside the device, the two studs 200 and 300 define a central cavity of the device which is left empty. A spacing L is defined as the distance between the two end surfaces of the studs 200 and 300 that are inside the device.

Thus, in its central portion over which the opening 110 extends, the support 100 forms a groove containing a portion of a glass stud at each of its two ends, and it is to these portions that respective ends of the fiber 400 are fixed.

On the top plane surfaces of the studs 200 and 300 there are fixed two respective ends of the optical fiber 400. More precisely, the ends of the fiber 400 are fixed to said surfaces in the vicinity of the edge 225 of the stud 200 and the corresponding edge of the stud 300. The optical fiber 400 is fixed with a selected amount of longitudinal pretension.

Each of the studs 200 and 300 is fixed to the tube 100 over its entire surface that is in contact with the tube.

The FIG. 1 device operates as follows. The glass constituting the studs 200 and 300 has a coefficient of thermal expansion that is positive and greater than the positive coefficient of the metal constituting the support 100, so an increase in temperature causes the volume of each of the studs 200 and 300 to increase relative to the support 100.

During this deformation, each of the two glass studs tends to extend at its ends, with its end facing towards the center of the device extending towards the center of the device and its end situated towards the end of the tube 100 extending outwards from the device.

Thus, stud zones close to the inside of the device tend to move towards the central portion of the device. In particular, the edge 225 of the stud 200 and the corresponding edge of the stud 300 move towards the center of the device.

This displacement of the edge 225 of the stud 200 towards the center of the device is further accentuated by the fact that the projection 220 is in contact against the end edge 125 of the window 110.

Thus, under the effect of an increase in temperature, the projection 220 expands, in particular along the direction X, and by bearing against the end 125 of the window 110, it pushes away from the end 125 all of the top surface of the stud 200 that is exposed through the window 110.

Because the stud 200 bears against a transverse edge 125, the device is highly effective. However, other devices without a transverse edge for the stud 200 to bear against can also operate, by the glass stud expanding in response to a temperature rise, to generate a displacement of a central top surface of the glass stud towards the center of the device.

Thus, the fixing points of the optical fiber 400 move towards each other when temperature increases, causing the fiber to relax, thereby making it possible to maintain a substantially constant Bragg wavelength, since the effect of the grating relaxing on variations in wavelength is opposite to the effect of an increase in temperature.

Naturally, when the device cools down, the fiber 400 is put back under more tension and there again its wavelength is kept constant.

The inventors have discovered that it is possible to make devices of the kind described above and more generally differential expansion devices by making use of a property presented by certain glasses whereby they are capable of reacting chemically with certain metals at high temperature, so as to produce bonding between the two materials at a common interface.

This bonding depends on the properties of the materials that are in contact and on the type of chemical reaction that takes place between the two materials.

For the device of FIG. 1, the metal constituting the support 100 and the glass constituting the studs 200 and 300 also need to be selected so that the coefficient of thermal expansion of the glass is considerably greater than the coefficient of thermal expansion of the metal.

By way of example, the selected metal is an alloy of the iron-nickel type. In particular, it is possible to use an alloy of that kind that is known under the trade name Invar. It is also possible to use such alloys having the trade name Super Invar.

By way of example, a Super Invar has the following chemical composition: 0.003% carbon; 0.11% silicon; 0.37% magnesium; 36.24% nickel; and 63.3% iron.

The selected metal may also be an alloy of the iron-nickel-cobalt type. In particular, it is possible to use such an alloy that is known under the trade name Kovar or Dilver.

The coefficients of thermal expansion of those various alloys lie in the range $0.2 \times 10^{-6}$ $K^{-1}$ to $5 \times 10^{-6}$ $K^{-1}$.

The metal may also be iron, where iron has a coefficient of thermal expansion of $12 \times 10^{-6}$ $K^{-1}$. It is also possible to use a stainless steel.

The glass or vitreous material constituting the studs 200 and 300 is constituted in this case by a glass having a large coefficient of thermal expansion. By way of example, it is possible to use a fluoride glass or a fluorophosphate glass. These glasses generally have coefficients of thermal expansion lying in the range about $15 \times 10^{-6}$ $K^{-1}$ to about $22 \times 10^{-6}$ $K^{-1}$.

With the support tube 100 preheated to a temperature for reaction between the glass and the selected metal, the previously molten glass raised at least to said reaction temperature is cast onto the support. In general, the glasses used have a melting temperature of about 800° C. to 900° C.

The glass is thus cast at a temperature that typically lies around a range of 550° C. to 650° C.

Prior to casting the glass, an insert is placed in the central portion of the tube, which insert has the shape of the central cavity that is to be obtained between the two glass studs in the end.

On being cast, the glass matches the inside shape of the tube 100 and fills exactly the cavities situated at each of the ends of the tube as defined by the inside surface of the tube and by the insert.

Once the glass has set, the insert is extracted from the central portion. There remains in the tube a cavity corresponding to the shape of the insert.

After cooling, the entire device is then annealed at a temperature of about 280° C. to 300° C.

The purpose of the annealing is to release thermal stresses in the glass that has just been cast. Such thermal stresses result from the glass going from a liquid state to a solid state. Annealing is not absolutely essential. It serves to avoid possible breaks and possible splinters that could disturb proper bonding between the glass and the metal.

The inventors have shown that when the various operations described above are performed under thermal conditions appropriate for the selected glass/metal pair, the glass bonds to the metal and remains rigidly secured thereto so there is no need to use an adhesive for holding those two materials fixed one against the other as has been the case in the past.

The glass and the metal react with each other in a temperature range that extends typically from above a temperature in the range 350° C. to 450° C.

Thereafter, flats are polished on the surfaces of the glass studs that project through the window 110 so that the top surfaces of the glass studs 200 and 300 through the window 110 are coplanar with the surfaces 120 and 130. Thereafter, two ends of the fiber 400 having the Bragg grating 420 photoetched therein are fixed to the two flats.

The ends of the fiber 400 can be stuck to the glass studs, e.g. using a cyanoacrylate adhesive, an epoxy adhesive, a resin that polymerizes on being exposed to ultraviolet, or by using other adhesives or adhesive methods.

Figure 2:
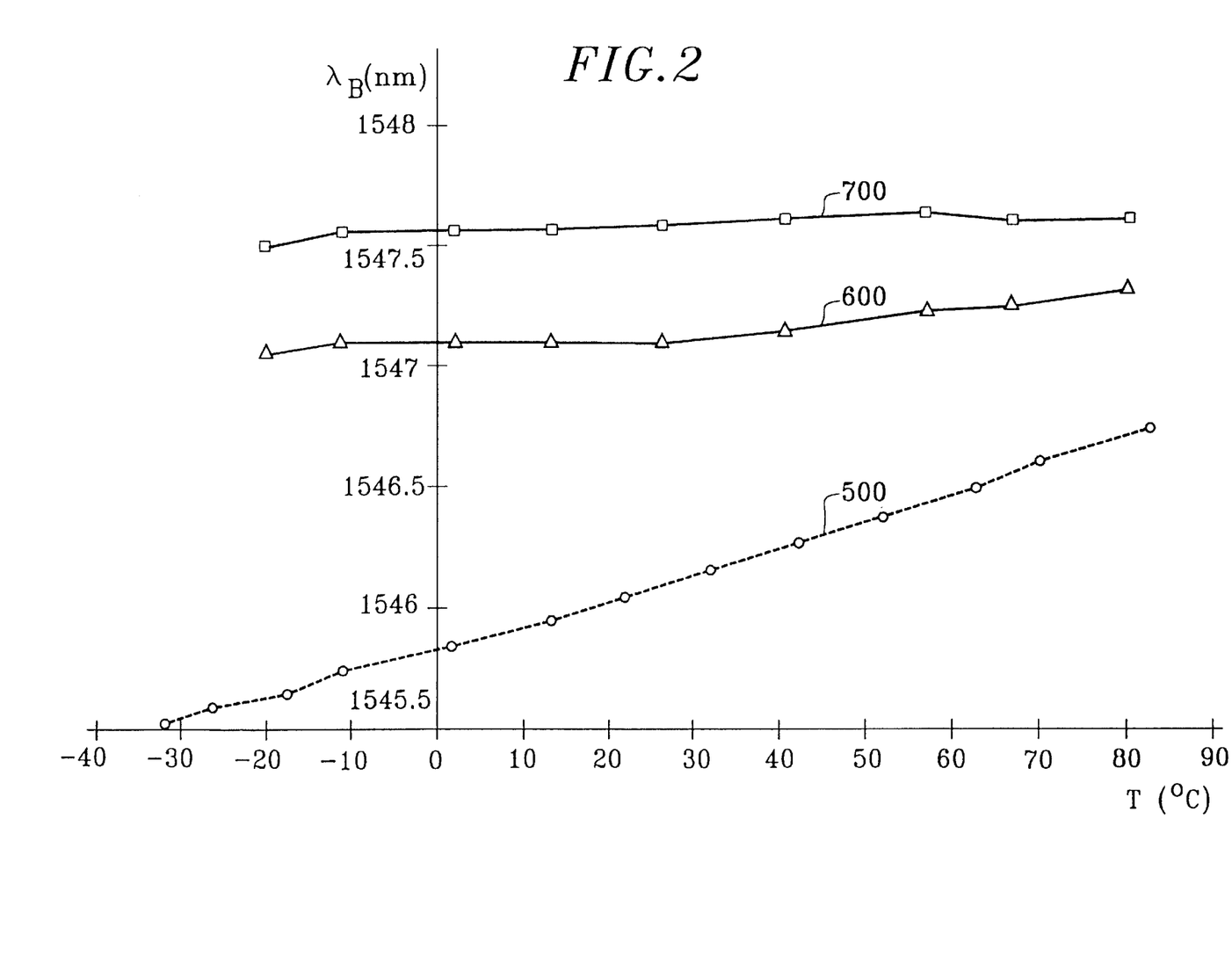
FIG. 2 is a graph showing how the Bragg wavelengths of a free grating and of gratings that are fixed to a device of the invention vary as a function of temperature.

FIG. 2 is a graph in which the curves show how Bragg wavelength varies as a function of temperature for three Bragg gratings photoetched so that at ambient temperature and when in the free state, i.e. when not subjected to pretension, they have a wavelength that is equal to 1546 nm.

In FIG. 2, plot 500 corresponds to a free grating fixed to no support and subjected to no stress, while plot 600 and plot 700 both correspond to Bragg gratings photoetched in respective fibers that are secured by adhesive to a device of the kind shown in FIG. 1.

In this case, the glass studs 200 and 300 were made of fluoride glass of the fluorozirconate type, whose major constituent, constituting slightly more than 50%, is zirconium fluoride, of formula $ZrF_4$. The coefficient of thermal expansion of that glass was $18 \times 10^{-6}$ $K^{-1}$.

The tube 100 was made of Super Invar and its coefficient of thermal expansion was $1.1 \times 10^{-6}$ $K^{-1}$.

The length of the central cavity L was 20 mm, and the fixing points of the fiber were also about 20 mm apart.

For plot 600, the fiber 400 was fixed on the glass studs with its grating subjected to pretension such that its wavelength was shifted to 1547.1 nm at ambient temperature, corresponding to the fiber being elongated by about 0.07%.

Plot 700 corresponds to a Bragg grating fixed with pretension such that its wavelength at ambient temperature was shifted to 1547.55 nm, equivalent to the fiber being elongated by about 0.1%.

All three gratings were put into a temperature-controlled vessel operating over a temperature range of −30° C. to +80° C.

As can be seen in FIG. 2, the variation in Bragg wavelength for the free fiber was 1.1 nm over a temperature range of 100° C., which is in agreement with theory.

For the grating corresponding to plot 600, variation in Bragg wavelength was 0.25 nm for a temperature change of 100° C. The sensitivity of Bragg wavelength to temperature was thus reduced by a factor of 4 by the device of the invention.

For the grating corresponding to plot 700, the variation in Bragg wavelength was 0.1 nm for a temperature change of 100° C. The sensitivity of the Bragg wavelength to temperature was thus, under those experimental conditions, reduced by a factor of 10, i.e. by an order of magnitude, by using the device of the invention.

Figure 3:
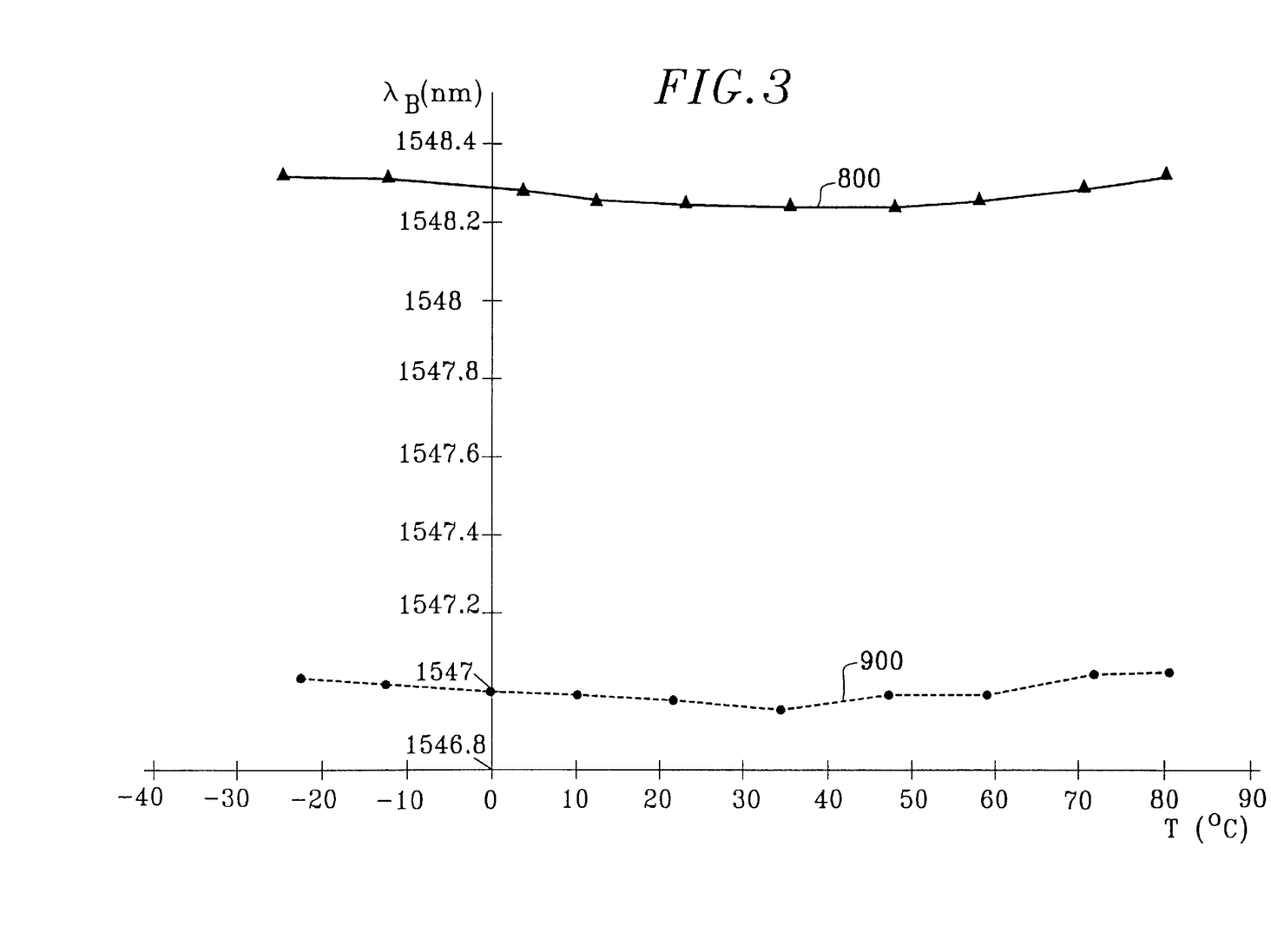
FIG. 3 is a graph showing how the Bragg wavelengths of two gratings fixed on a device of the present invention vary as a function of temperature.

FIG. 3 is a graph showing how the Bragg wavelength varied for two photoetched gratings fixed to devices of the kind shown in FIG. 1. In those devices, the material constituting the tubular support was Invar. The glass constituting the studs was a fluorophosphate glass, constituted in this example by 90% to 95% metal fluorides and 5% to 10% $P_2O_5$. This glass had an expansion coefficient of $15 \times 10^{-6}$ $K^{-1}$.

The two photoetched gratings had Bragg wavelengths in the free state and at ambient temperature respectively equal to 1545.5 nm and 1546.75 nm.

The two gratings were fixed on respective devices with pretension such that the Bragg wavelength of each of them was shifted by 1.5 nm, corresponding to elongation of about 0.1%.

Before being subjected to temperature variations, the two gratings fixed in that way thus had Bragg wavelengths of 1547.00 nm and 1548.25 nm respectively.

Whereas the gratings corresponding to FIG. 2 were fixed to the glass studs by points of glue that were spaced apart by 20 mm, in this example the gratings were fixed to glass studs with the spacing between the points of glue being equal to 16 mm and to 17 mm.

Thus, in FIG. 3, plot 800 corresponds to a spacing of 16 mm between the points of adhesive, while plot 900 corresponds to a spacing of 17 mm between the points of adhesive.

Those two devices were likewise subjected to a temperature cycle over the range −30° C. to +80° C.

In FIG. 3, it can be seen that the sensitivity of the Bragg wavelength relative to temperature was reduced in both cases by at least a factor of 10, and by more than that for the device whose glass studs were 16 mm apart.

These two devices thus enabled variations in the Bragg wavelength of the gratings to be reduced to 0.09 nm for a temperature change of 100° C.

Figure 4:
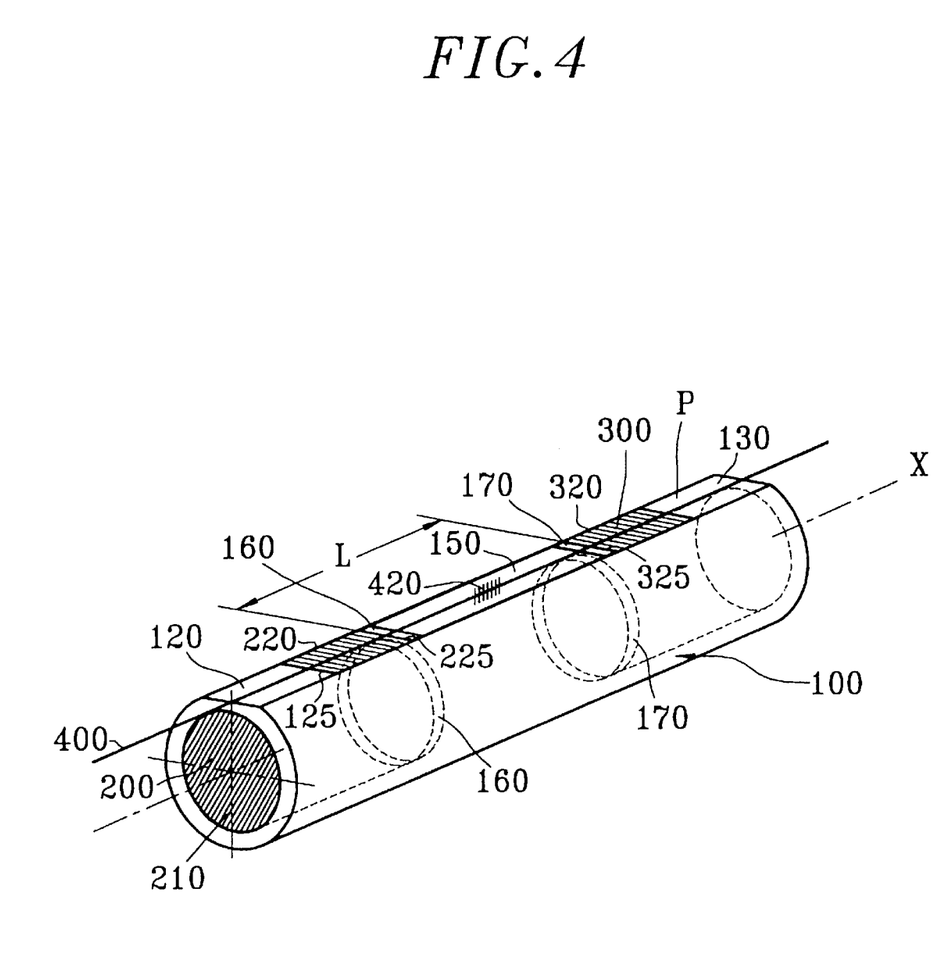
FIG. 4 is a perspective view of a device constituting a second variant of the invention.

FIG. 4 shows a device constituting a second variant of the invention. The device of FIG. 4 differs from that of FIG. 1 only by the fact that the central cavity provided in the FIG. 1 device is partially occupied by a stud 150 of a metal material that is integral with the support 100.

The same numerical references are used in FIG. 4 for elements of the device which are similar to elements of the device shown in FIG. 1.

More precisely, the space defined by the entire central cavity of the FIG. 1 device is now occupied by a metal stud 150, with the exception of two flat spaces 160 and 170 extending transversely to the direction X and leaving room for the transverse surfaces at the inside ends of the glass studs 200 and 300 to extend towards the center of the device across the thickness of the spaces 160 and 170.

More precisely, the central metal stud 150 does not come into contact with either of the studs 200 and 300, since the studs 200 and 300 adjacent to the central portion of the device are spaced apart from the central stud 150 by the spaces 160 and 170.

Thus, for each of the studs 200 and 300, the stud surfaces adjacent to the central portion 150 of the device and extending transversely to the axis X are free to deform and move towards the central portion of the device. The top projections referenced 220 and 320 of the respective studs 200 and 300 can in particular extend longitudinally relative to the device, thereby enabling the pretension applied to the Bragg grating 400 to be relaxed.

Also, the central metal stud 150 has a top plane surface 155 coplanar with above-defined plane P. Thus, the fiber 400 having the grating 420 photoetched therein, and in particular a bare length of fiber having the grating 420 therein, rests on said plane metal top surface 155. The grating is then covered in a protective resin, after assembly.

The FIG. 4 device is made using the same method as the FIG. 1 device, with the spaces 160 and 170 being kept empty during casting of the glass by means of two inserts of appropriate shape.

In this way, the metal support of FIG. 4 has two cavities at either end of its central metal stud 150, with each of said cavities having a glass stud cast therein.

Figure 5:
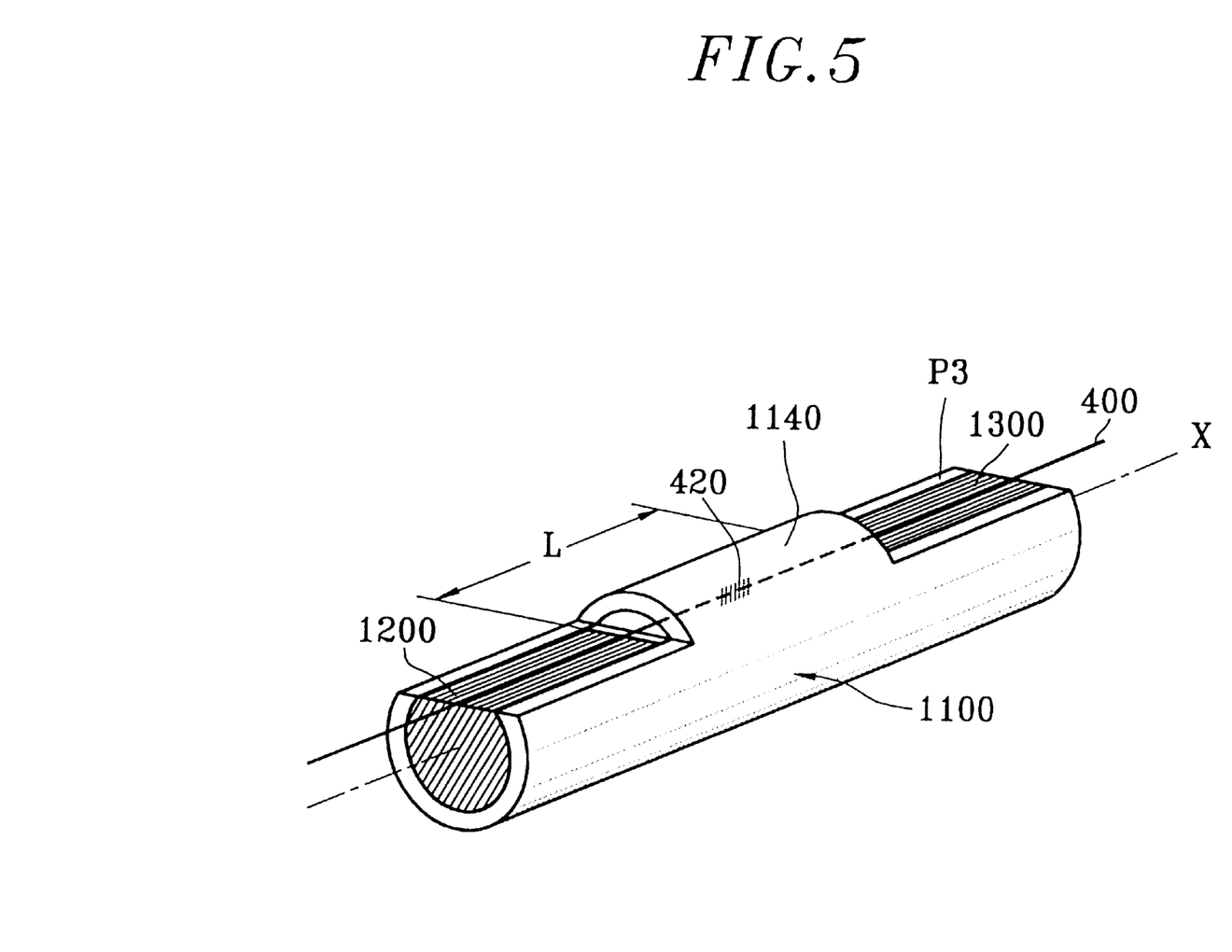
FIG. 5 is a perspective view of a device constituting a third variant of the invention.

FIG. 5 shows a device constituting a third variant of the invention. In this variant, the metal support 1100 is a tube which has had two portions removed therefrom, each defined laterally by two generator lines of the tube 1100 and each occupying one-third of the length of the tube 1100, starting from a respective end thereof.

More precisely, the tube 1100 is cut on a plane P3 parallel to the main axis X of circular symmetry of the tube 1100, but not coinciding with the axis X, said cut starting from each of the ends of the tube 1100, and extending on each occasion over one-third of the length of the tube adjacent to the end in question.

The support 1100 is thus made up of three portions, a central portion 1140 having a full tubular wall, and two end portions each having a top window.

Each of the end portions thus forms a cavity which is filled with glass as in the above-described method. More precisely, each end portion contains a glass stud 1200 or 1300 which extends between two planes extending transversely to the direction X, a first plane being defined by the end of the tube 1100, and a second plane being defined by the boundary between the central portion and the end portion in question, i.e. that end of the corresponding window which is closer to the center of the device.

The glass studs 1200 and 1300 have top portions forming a plane surface that coincides with the section plane P3 of the tube 1100.

Thus the full tubular portion in the center of the device does not have a glass portion. An optical fiber 400 with a Bragg grating 420 is fixed as described above to the top surfaces of the glass studs, and it is under tension inside the central tubular portion 1140.

In this device, the Bragg grating photoetched in the fiber is protected from mechanical or chemical attack, with the fiber 400 being bare only under the metal cover formed by the central tubular portion 1140.

More generally, the inventors have discovered that a mechanical support having a groove or cavities that are open on top is particularly suitable for easy casting of the glass studs in the support, thereby giving the device made in this way very good performance in terms of temperature stabilization.

Thus, the fact that the glass studs are fixed in cavities or in a groove, which groove or cavities present an inside surface that is of U-shaped outline transversely to the direction of the fiber, and the fact that the glass stud is fixed to a bottom surface and to surfaces forming the inside lateral margins of the U-shape make it possible to obtain a stabilization device that is particularly effective.

Such shapes serve in particular to obtain displacements of a point where the fiber is stuck to the exposed surface of the glass stud that are particularly well matched to the sizes of the displacements desired for the ends of the fiber.

In addition, the fact that the glass stud is fixed inside the cavity or groove by a bottom surface and by the surfaces of the groove or cavity that are located laterally relative to a main direction of the optical fiber, guarantees that the device is very robust, further improving the lifetime of the fixing between the glass and the metal.

The inventors have also observed that the fact that the glass studs are fixed to an inside surface of the support that is in the form of a circular cylinder confers extra lifetime to the fixing between the glass and metal. More generally, the fact that the metal support is tubular in shape and the fact that the studs are in the shape of circular cylinders that are complementary to the inside space of the support, confers performance on the device that is particularly effective in terms of temperature stabilization, and said performance is particularly reliable.

Figures 6, 7:
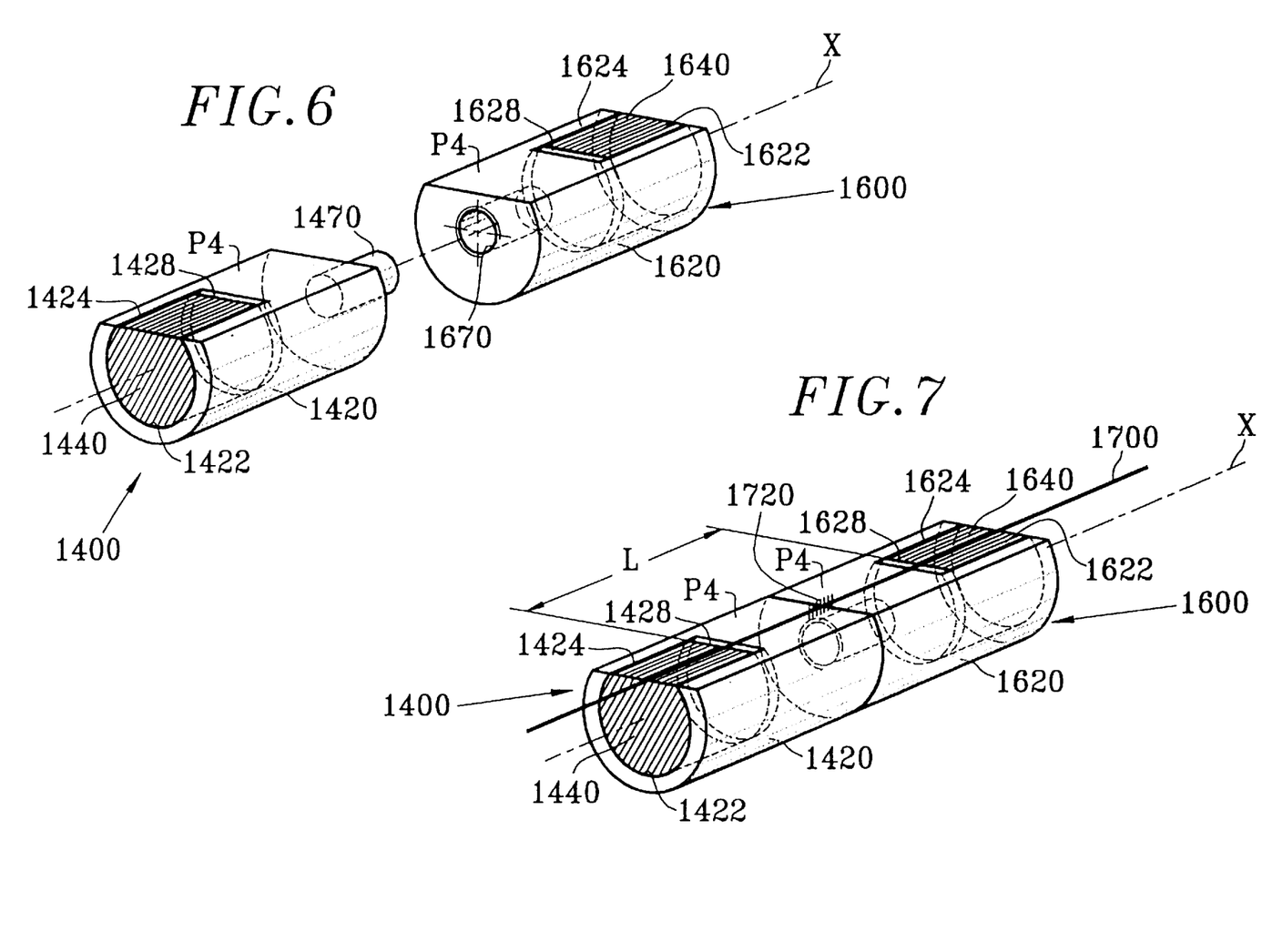
FIG. 6 is a perspective view of a device constituting a fourth variant of the invention, shown in a disassembled state.
FIG. 7 is a perspective view of the same device as FIG. 6, but shown in an assembled state.

FIGS. 6 and 7 show a device constituting a fourth variant of the invention.

This device comprises two mutually separable elements 1400 and 1600, each comprising a respective metal support 1420 or 1620, and a respective glass stud 1440 or 1640.

Each of the metal supports 1420 and 1620 is of the general shape of a cylinder having a coaxial cylindrical inside cavity 1422 or 1622 extending halfway along the cylinder from one of its ends.

Thus, within each of the two metal supports 1420 and 1620, there can be seen a solid portion and a hollow portion following one another along the main axis X of the support.

Furthermore, each of the metal supports 1420 and 1620 is generally in the form of a cylinder that has been cut on a plane P4 parallel to the main axis X of the cylinder, said plane P4 not coinciding with the axis X.

The plane P4 is close enough to the axis X to ensure that the hollow portion of the metal support in question, as constituted by a cylindrical wall, is interrupted over a portion of its circumference.

Thus, each of the hollow portions has a top window 1424 or 1624 extending longitudinally from one end of the metal support 1420 or 1620, and up to the boundary between the hollow portion and the solid portion of the metal support 1420 or 1620 in question.

Each of the hollow portions of the two elements 1400 and 1600 thus forms a cavity having an open top portion extending along the axis X.

Inside each of the cylindrical cavities 1422, 1622, there is a glass stud 1440, 1640. Each of the two glass studs 1440, 1640 is put into place by casting glass into the corresponding cavity 1422, 1622 using the method as described above, and using an appropriate insert to reserve a flat space 1428, 1628 extending transversely to the main direction X of the support in question between the glass stud 1440, 1640 and the solid portion of the corresponding metal support 1420, 1620.

As in the devices described above, each of the two flat spaces 1428 and 1628 is designed to enable a portion of the corresponding stud 1440, 1640 adjacent to a Bragg grating to deform towards a middle zone of the overall device.

Furthermore, each of the glass studs 1440 and 1640 is flush with the top window 1424, 1624 of the hollow portion in which it is located, i.e. it forms a top plane that coincides with a plane P4 containing the longitudinal edges of the corresponding top window 1424, 1624.

At their solid ends, each of the dismountable elements 1400 and 1600 has an end surface extending transversely to the direction X and provided in its center with a respective engagement element, a male element 1470 and a female element 1670, with the two engagement elements being complementary to each other.

In the embodiment of FIGS. 6 and 7, the male element 1470 is a threaded cylindrical peg, and the female element 1670 is a cylindrical cavity having an inside thread. The two separable elements 1400 and 1600 are thus adapted to be assembled together by being screwed together about the main axis X.

FIG. 7 shows the device once the separable elements 1400 and 1600 have been screwed together, with the top planes of the glass studs 1440 and 1640 thereof being coplanar with each other in this disposition.

Once the elements 1400 and 1600 have been assembled together in this way, an optical fiber 1700 having a Bragg grating 1720 photoetched therein has its ends fixed to the glass studs 1440 and 1640 respectively, and more precisely fixed to the top face of each of said glass studs, and on each occasion the fixing is provided at a point adjacent to the space 1428 or 1628 that exists between the glass stud 1440 or 1640 and the solid portion of the separable element in question.

As in the preceding devices, the fiber 1700 is fixed with a selected amount of pretension.

The device of FIGS. 6 and 7 is particularly suitable for mass production. Casting the two glass studs 1440 and 1640 separately in two separate supports has numerous advantages.

Thus, each of the two metal supports can be oriented in the most appropriate direction during casting, in particular by tilting the axis X of the metal support relative to the horizontal, whereas when the metal support is constituted by a single piece, it needs to be placed during casting in such a manner as to enable both glass studs to be cast, thereby restricting the orientations that can be used for the support during casting.

Such a two-part metal support device also has the advantage of enabling the spacing between the glass studs to be controlled with precision.

Such a device makes it possible to cast the glass studs initially, and then to machine the surfaces of the metal supports that are to come into contact with each other when the supports are assembled together, thereby making it possible to adjust the spacing between the glass studs optimally. Such adjustment by machining metal parts is easier than adjustment performed solely by defining the glass studs on casting by very precise adjustment of the shapes of the inserts used.

Naturally, the present invention is not limited to the device structures described above or to the particular materials given herein as examples.

[1] G. Meltz, W. W. Morey, W. H. Glenn, "Formation of Bragg gratings in optical fibers by a transverse holographic method", Optical Letters, 14, pp. 823–825, 1989;

[2] T. Iwashima, A. Inoue, M. Shigematsu, M. Nishimura, Y. Hattori, "Temperature compensation technique for fiber Bragg gratings using liquid crystalline polymer tubes", Electronic Letters, Vol. 33, No. 5, pp. 417–419, Feb. 27, 1997;

[3] D. L. Weidman, G. H. Beall, K. C. Chyung, G. L. Francis, R. A Modavis, R. M. Morena, "A novel negative expansion substrate material for athermalizing fiber Bragg gratings", 22nd European Conference on Optical Communication, Oslo, 1996, Paper MoB 3.5, pp. 1-61/1-64;

[4] G. W. Yoffe, P. A. Krug, F. Ouellette, D. A. Thorncraft, "Passive temperature-compensating package for optical fiber gratings", Applied Optics, Vol. 34, No. 30, pp. 6859–6861, Oct. 20, 1995;

[5] W. M. Morey, W. L. Glomb, "Incorporated Bragg filter temperature compensated optical waveguide device," U.S. Pat. No. 5,042,898, Aug. 27, 1991;

[6] J. Rioublanac, J. M. Blondy, P. Facq, "Optimisation d'un système de stabilisation passive de la dérive en température de la longueur d'onde d'accord des réseaux de Bragg" [Optimization of a passive system for stabilizing temperature drift in the tuned wavelengths of Bragg gratings], JNOG96, pp. 261–263;

[7] Thesis No. 14-1997 supported by J. Rioublanc on Jun. 6, 1997, at the University of Limoges, entitled: "Etude d'un système de stabilisation passive de la dérive en température de la longueur d'onde d'accord des réseaux de Bragg" [Study of a passive system for stabilizing temperature drift in the tuned wavelengths of Bragg gratings].

What is claimed is:

1. A method of making a device for stabilizing the Bragg wavelength of a Bragg grating relative to variations in temperature, operating on the principle of differential expansion between a glass and a metal in order to produce on an increase in temperature relaxation of pretension initially applied to the grating, wherein:

a) the glass and the metal are chosen suitable for fixing to each other by a chemical reaction between them in an appropriate temperature range; and b) the glass is put into contact with the metal at a temperature lying in said appropriate temperature range.

2. A method according to claim 1, including a step consisting in casting the glass onto a support of said metal.

3. A method according to claim 2, wherein the glass is cast at a temperature selected in the appropriate temperature range, and wherein prior to casting the glass, the metal support is preheated to a temperature substantially equal to the selected temperature.

4. A method according to claim 1, including the steps consisting in:

placing the glass on a support of said metal; and heating the assembly constituted by the glass and the metal support to a temperature selected so that the glass and the metal react chemically and bond together.

5. A method according to claim 4, wherein the assembly made of the glass and the metal support is annealed at a temperature lying in the range about 280° C. to about 300° C.

6. A method according to claim 1, wherein the glass is a fluoride glass.

7. A method according to claim 1, wherein the glass is a fluorophosphate glass.

8. A method according to claim 1, wherein the metal is an iron-nickel alloy.

9. A method according to claim 1, wherein the metal is an iron-nickel-cobalt alloy.

10. A method according to claim 1, wherein the metal is Invar.

11. A method according to claim 1, wherein the metal is Kovar.

12. A method according to claim 1, wherein the metal is iron.

13. A method according to claim 1, wherein the metal is stainless steel.

14. A method according to claim 1, including the steps consisting in:

supplying a metal support; and placing the glass on the metal support so as to form two glass studs each having an end surface inside the device extending substantially across a main axis passing through the two studs, said surface being covered on each occasion in an empty space.

15. A method according to claim 14, including the steps consisting in:

supplying a metal support forming a groove; and putting glass studs into place in the groove so that they are fixed at least to the inside faces of the groove forming the lateral margins thereof.

16. A method according to claim 14, wherein the support forms two cavities, each of which cavities has an inside face of U-shaped section in a plane extending transversely to an axis passing through both cavities, and wherein the glass studs are put into place in each of the cavities.

17. A method according to claim 15, wherein the metal forms a groove or cavities which define a zone in the form of a circular cylinder.

18. A method according to claim 1, wherein the metal forms a support which has an outside shape that is substantially in the form of a circular cylinder.

19. A method according to claim 17, wherein the groove or the cavities have a respective top opening with one end forming a surface that faces the central portion of the support, and wherein the glass studs are placed on the support in such a manner as to be in contact with said surface.

20. A method according to claim 16, wherein the metal support has a metal stud between the two cavities, the metal stud being provided with a surface that is substantially plane, and wherein each of the glass studs is put into place in the corresponding cavity in such a manner that each glass stud exposes a surface that is coplanar with the substantially plane surface of the metal stud.

21. A method according to claim 14, wherein the metal support forms a wall suitable for surrounding an optical fiber having its ends fixed to respective ones of the glass studs.

22. A method according to claim 1, including the steps consisting in:

providing a support of said metal, the support being made up of two separate half-supports, with each of the two half-supports having a respective cavity;

placing studs of said glass in the cavities of the two half-supports; and assembling together the two half-supports.

23. A method according to claim 22, wherein one of the two half-supports carries a screw and the other half-support carries a threaded cavity complementary to the screw.

24. An optical component comprising a Bragg grating and a device for stabilizing the Bragg wavelength of the grating relative to temperature variations, the device being made by a method according to claim 1.

* * * * *

UNITED STATES PATENT AND TRADEMARK OFFICE
CERTIFICATE OF CORRECTION

PATENT NO. : 6,112,553  
DATED : September 5, 2000  
INVENTOR(S) : Poignant et al Page 1 of 1

It is certified that error appears in the above-identified patent and that said Letters Patent is hereby corrected as shown below:

On title page,

In References Cited, item [56], under Other Publications, at J. Stone, delete "Compendsated" and insert -- Compensated --.

Signed and Sealed this

Twenty-fourth Day of July, 2001

Attest:

NICHOLAS P. GODICI

*Attesting officer*  *Acting Director of the United States Patent and Trademark Office*